(12) United States Patent
Xu

(10) Patent No.: US 9,364,989 B2
(45) Date of Patent: Jun. 14, 2016

(54) SEALANT INJECTOR FOR MOLDING A DISPLAY FRAME AND THE MOLDING METHOD THEREOF

(71) Applicant: SHENZHEN CHINA STAR OPTOELECTRONICS TECHNOLOGY CO., LTD., Shenzhen, Guangdong (CN)

(72) Inventor: Liang Xu, Guangdong (CN)

( * ) Notice: Subject to any disclaimer, the term of this patent is extended or adjusted under 35 U.S.C. 154(b) by 0 days.

(21) Appl. No.: 13/983,915

(22) PCT Filed: Jun. 30, 2013

(86) PCT No.: PCT/CN2013/078543
§ 371 (c)(1),
(2) Date: Aug. 6, 2013

(87) PCT Pub. No.: WO2014/201728
PCT Pub. Date: Dec. 24, 2014

(65) Prior Publication Data
US 2016/0096306 A1    Apr. 7, 2016

(30) Foreign Application Priority Data

Jun. 20, 2013 (CN) .......................... 2013 1 0247324

(51) Int. Cl.
*B29C 47/68* (2006.01)
*B29C 45/20* (2006.01)
*B29L 31/34* (2006.01)

(52) U.S. Cl.
CPC ................. *B29C 47/68* (2013.01); *B29C 45/20* (2013.01); *B29L 2031/3475* (2013.01)

(58) Field of Classification Search
CPC .. B29C 47/68; B29C 45/20; B29L 2031/3475
See application file for complete search history.

(56) References Cited

U.S. PATENT DOCUMENTS 8,147,645 B2 * 4/2012 Jung ..................... G02F 1/1339
118/313

FOREIGN PATENT DOCUMENTS

| KR | 20050002432 | * | 1/2005 |
| KR | 2006057774  | * | 5/2006 |
| KR | 2009052948  | * | 5/2009 |

* cited by examiner

*Primary Examiner* — Jill Heitbrink

(57) ABSTRACT

The sealant injector for molding a display frame is provided for extruding the sealant out of the cavity, the large impurity particles could be insulated from the filtrating holes for preventing the mixing particles or the air bubble forcing out from the spray nozzle. The extrusion sealant could be more uniform. The sealant could be coated on the base board with the filtering and forcing. Accordingly, it would increase the continuation, the stability, the strength and the tenacity of the sealant and then improve the rate of good products. On the process of filtering and extruding together, it could reduce the molding time and improve the manufacture efficiency. The present invention also provides a method for injection molding a display frame using the sealant injector.

15 Claims, 3 Drawing Sheets

SEALANT INJECTOR FOR MOLDING A DISPLAY FRAME AND THE MOLDING METHOD THEREOF

FIELD OF THE INVENTION

The present invention is related to the device and method for molding a display frame, and more particularly relates to a sealant injector for molding the display frame and the molding method thereof.

BACKGROUND OF THE INVENTION

With the development of information, the requirement for the display device is increasing day by day. For satisfying the requirement, there are several flat panel display equipments as LCD, PDP or OLED are developing rapidly. In the flat panel display equipments, the LCD with a lot of advantages as low weight, small size and low energy consumption is replaced the cold cathode display equipment step by step.

The TFT-LCD includes an array substrate, a color film substrate and liquid crystal between the two substrates. To adhere the two substrates together, the sealant is surrounding of the display equipment. The sealant should satisfy the following characteristics:

1) With good adhesion force, then the two substrates could not easy to strip down while on using;
2) With high strength, the display frame could be broken easily;
3) Because the liquid crystal could not contact the oxygen or water, the display frame should insulate from the oxygen and water;
4) The sealant could not mix with the larger impurity particles. If mixing the large impurity particles, the two substrates would be pushed up and then the oxygen and water could easy inflow in, and then the adhesion of the display frame is cut down even bring the two substrates separating and make the TFT-LCD damage, so the sealant should pass thought the filtrating equipment before the finish product achieved.

For ensure the thickness of the side of the liquid display device, some space blocks are provide for filling and mixing with the sealant, e.g. spherical or fibroid space blocks. With the space blocks, the two substrates are adhered to each other to form an uniform thickness frame. The space blocks are uniformly dispersing in the sealant. The bubble should be defoamed before extrusion. If the bubble is existed, the sealant would be easy to break on coating.

On coating, the defoamed sealant which mixing with the space block is inserted in the sealant injector. The sealant injector is made from a non-transparent and metal material and a transparent and plastics material. The upper end of the sealant injector is connecting to the high pressure nitrogen, and the under end is connecting to the spray nozzle. With the pressure of the nitrogen, the sealant could be force out from the spray nozzle. The size of the spray nozzle is about 150~500 µm that the space block could be go through from the spray nozzle.

During the producing process, with the restriction of the operation and the environment, when on the mixing of the space block, the defoaming or filling of the sealant, the large impurity particles are easy to be inserted into the cavity. The moderate impurity particles would not bring great influence in coating. However, if the size of the impurity particle is more than 10 µm, the display frame would be not uniform and even be scraped.

The sealant should be filtered by the filtrating equipment before molding. But the sealant should not be filtered when on molding. The molding process of the prior art is complex and the produce efficiency is low. In addition, more filtrating equipments should be invested to increase the cost of the manufacture.

Therefore, it is necessary to provide a sealant injector with high production efficiency, simple procedure and the filtering effect well.

SUMMARY OF THE INVENTION

The main purpose of the present invention is to provide a sealant injector for molding the display frame and the method for insulating the large impurity particles.

The present invention provides a sealant injector for molding a display frame, which comprising a cavity, an opening is opening on the top of the cavity for connecting with the high pressure nitrogen, and a spray nozzle is located at the bottom of the cavity, the sealant filling in the cavity could be extruded from the spray nozzle, wherein a filtrating equipment is located in the cavity for insulating a plurality of larger impurity particles mixing with the sealant.

According to an embodiment disclosed herein, a plurality of the filtrating holes are opening at the filtrating equipment, the diameter of the hole is 10~50 µm, the shape of the filtrating hole could be selected from the circular, the square or the oblong shape. The gap between the filtrating holes is equal to each other. The inner diameter of the outlet of the spray nozzle is 150~500 µm.

According to another embodiment of the present invention, the filtrating equipment is clamped in the middle of the sealant injector. The cavity is separated into an upper cavity and an under cavity by the filtrating equipment, and a step is forming between the upper cavity and the under cavity for keep the filtrating equipment on it. The inner diameter of the upper cavity is larger than that of the under cavity and the diameter of the filtrating equipment is equal to the inner diameter of the upper cavity.

According to another embodiment of the present invention, two gas-guide tubes are separately inserted into the upper cavity and the under cavity for connecting the high pressure nitrogen, the pressure of the upper cavity is greater than that of in the under cavity before coating, and the pressure of the upper cavity is equal to and less than that of in the under cavity when on coating.

According to another embodiment of the present invention, the gas-guide tubes comprise an inner gas-guide tube and an outer gas-guide tube enwrapping together, the inner gas-guide tube is inserted into the filtrating equipment which the one end of the inner gas-guide tube is connecting with the high pressure nitrogen and the other end is lead it into the under cavity, the outer gas-guide tube is around the inner gas-guide tube for leading the high pressure nitrogen into the under cavity. The pressure difference between the upper cavity and the under cavity is 0~0.7 MPa.

The present invention also provides a method for injection molding a display frame using the sealant injector, which comprising the following steps:

Step 1) Inserting the filtrating equipment into the cavity to separate the cavity into the upper cavity and the under cavity;

Step 2) Connecting one end of the inner gas-guide tube to the high pressure nitrogen and inserting the other end into the filtrating equipment;

Step 3) Filling the sealant in the cavity to package it;

Step 4) Leading the high pressure nitrogen separately into the under cavity via the inner gas-guide tube and into the upper cavity via the outer gas-guide tube to force the sealant into the under cavity, and then to be force out from the spray nozzle with a plurality of larger impurity particles insulating by the filtrating equipment;

Step 5) Molding the extrusive sealant in the mould to form the display frame.

Compared to the prior art, The sealant injector for molding a display frame is provided for extruding the sealant out of the cavity, the large impurity particles could be insulated from the filtrating holes for preventing the mixing particles or the air bubble forcing out from the spray nozzle. The extrusion sealant could be more uniform. The sealant could be coated on the base board with the filtering and forcing. Accordingly, it would increase the continuation, the stability, the strength and the tenacity of the sealant and then improve the rate of good products. The sealant injector of the present invention has a breakthrough on the molding of the display frame comparing with the prior filtering system. On the process of filtering and extruding together, it could reduce the molding time and improve the manufacture efficiency. The inner and smaller filtrating equipment of the present invention is replaced the outer and larger filtrating equipment of the prior art for reducing the input of the cost. More important, the different gas-guide tubes are separately inserted into the upper cavity and the under cavity which are divided by the filtrating equipment. With leading the different pressure into the upper cavity and the under cavity separately, the extruding and coating would be more smoothly. On the other hand, the larger impurity particles could not be embedded into the filtrating holes to make the coating process stability and smoothly. With the adjusting of the pressure value, the larger impurity particles could be blow up from the filtrating holes to ensure it smoothly coating, so that the particles could not be force onto the base board.

DETAILED DESCRIPTION OF PREFERRED EMBODIMENTS

Figure 1:
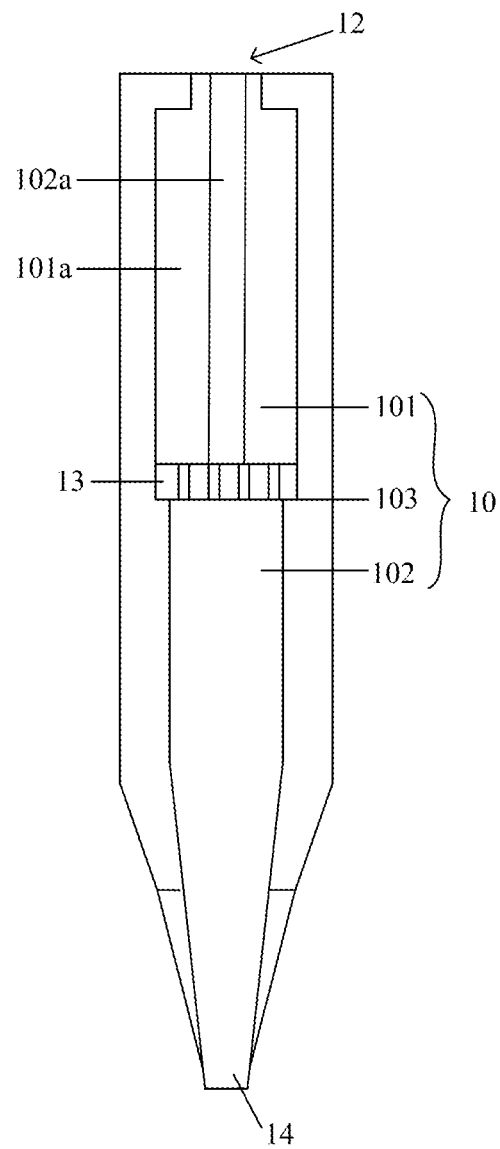
FIG. 1 is a sectional view of the sealant injector according to the present invention.

Refer to FIG. 1, the present invention provides a sealant injector 100 for molding a display frame, which comprising a cavity 10, an opening 12 is opening on the top of the cavity 10 for connecting with the high pressure nitrogen, and a spray nozzle 14 is located at the bottom of the cavity 10, the sealant filling in the cavity could be extruded from the spray nozzle 14. In the present embodiment, a filtrating equipment 13 is located in the cavity 10 for insulating a plurality of larger impurity particles mixing with the sealant.

In the prior art, the cavity 10 is run through up and down to filling the sealant. The high pressure nitrogen is lead from the opening 12. On the pressure of the high pressure nitrogen, the sealant could be extruded from the spray nozzle 14. The inner diameter of the outlet of the spray nozzle 14 is 150~500 µm. For extruding the larger impurity particles mixing with the sealant, the filtrating equipment 13 is located inside the cavity 10. The cavity 10 is separated into an upper cavity 101 and an under cavity 102 by the filtrating equipment 13. A step 103 is forming between the upper cavity 101 and the under cavity 102. The filtrating equipment 13 is clamped on the step 103. The outer wall of the filtrating equipment 13 is internally tangent to the inner wall of the upper cavity 101. A plurality of the filtrating holes 104 opening at the filtrating equipment 13 are provided for filtering the larger impurity particles from the sealant, so as to achieve the purpose of filtrating and extruding on the same time. The filtrating equipment 13 is closed to the upper cavity 101 and the diameter of the filtrating equipment 13 is equal to the inner diameter of the upper cavity 101. The filtrating equipment 13 is made of high hardness materials, e.g. metal or polymeric materials. The filtrating equipment 13 could be disassembled and cleaned with ultrasonic for the purpose of circulate use.

At the present embodiment, the inner diameter of the upper cavity 101 is larger than that of the under cavity 102, so that the filtrating equipment 13 could be hold up on the step 103 to separate the upper cavity 101 and the under cavity 102. With the extruding of the sealant, a plurality of particles could be separated by the filtrating hole 104, and then the extruded sealant would be more uniform. The uniform sealant could be more tenacity and not easy to be break without the air bubble and the impurity particles inside. The spacer blocks could pass through the filtrating equipment 13. The diameter and the shape of the filtrating hole 104 is suitable to that of the space block, therefore the space blocks and the smaller particles could pass through the filtrating hole 104 and the larger impurity particles could not pass. Accordingly, the problem of bad sealing bringing by the larger impurity particles would be overcome.

Preferably, for controlling the extruding pressure of the sealant before and after the coating, an inner gas-guide tube 102a is provided for inserting into and going through the upper cavity 101 from the opening 12, and then the other end of the inner gas-guide tube 102a could be inserted into the filtrating equipment 13. In the upper cavity 101, the outer part of the inner gas-guide tube 102a is the outer gas-guide tube 101b. The inner gas-guide tube 102a and the outer gas-guide tube 101b are enwrapping together into a drive-tube. The two gas-guide tubes are respectively connecting with the high pressure nitrogen. The inner gas-guide tube 102a is inserted into the filtrating equipment 13 to lead the high pressure nitrogen into the under cavity 102. The outer gas-guide tube 101b is inserted into the upper cavity 101 to lead the high pressure nitrogen in it. That is to say, the inner gas-guide tube 102a and the outer gas-guide tube 101b are separately lead the high pressure nitrogen into the under cavity 102 and the upper cavity 101, in addition, the pressure of the high pressure nitrogen of the two gas-guide tube could be not equal.

In the present embodiment, the filtrating equipment 13 could be assembled at the inner wall of the sealant injector with some screws.

Figure 3:
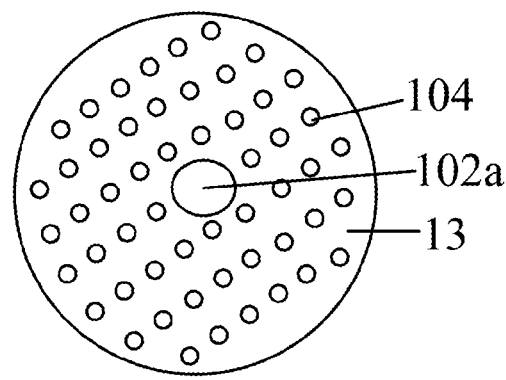
FIG. 3 is a first vertical view of the filtrating equipment of the sealant injector according to the present invention.
Figure 4:
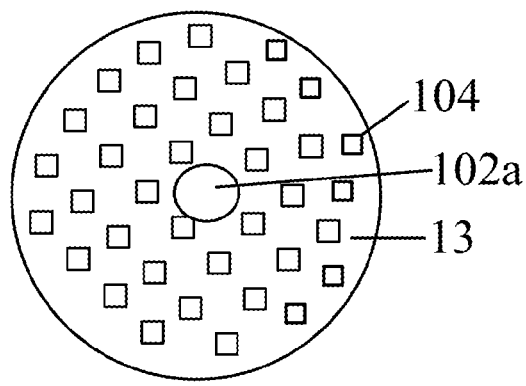
FIG. 4 is a second vertical view of the filtrating equipment of the sealant injector according to the present invention.
Figure 5:
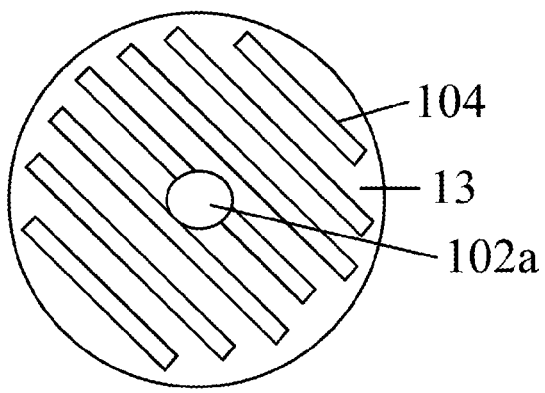
FIG. 5 is a third vertical view of the filtrating equipment of the sealant injector according to the present invention.

Refer to FIGS. 3-5, the inner gas-guide tube 102a is extend outward the middle of the filtrating equipment 13 and inserted into the under cavity 102 for lead the high pressure nitrogen into. The shape of the filtrating hole 104 could be selected from the circular, the square and the oblong shape and so on. The gap between the filtrating holes 104 is equal to each other. The diameter of the hole is 10~50 µm.

In the present embodiment, the pressure difference between the upper cavity 101 and the under cavity 102 is 0~0.7 MPa. The certain pressure difference is depending on the viscosity of the sealant, the size of the spray nozzle and the coating area to adjust.

The present invention also provided a method for injection molding a display frame using the sealant injector, which comprises the following steps:

Step 1) inserting the filtrating equipment into the cavity to separate the cavity into the upper cavity 101 and the under cavity 102;

Step 2) connecting one end of the inner gas-guide tube 102a to the high pressure nitrogen and inserting the other end into the filtrating equipment 13;

Step 3) filling the sealant in the cavity 101 to package it;

Step 4) leading the high pressure nitrogen separately into the under cavity 102 via the inner gas-guide tube 102a and into the upper cavity 101 via the outer gas-guide tube 101b to force the sealant into the under cavity 102, and then to be force out from the spray nozzle 14 with a plurality of larger impurity particles insulating by the filtrating equipment 13;

Step 5) molding the extrusive sealant in the mould to form the display frame.

Figure 2:
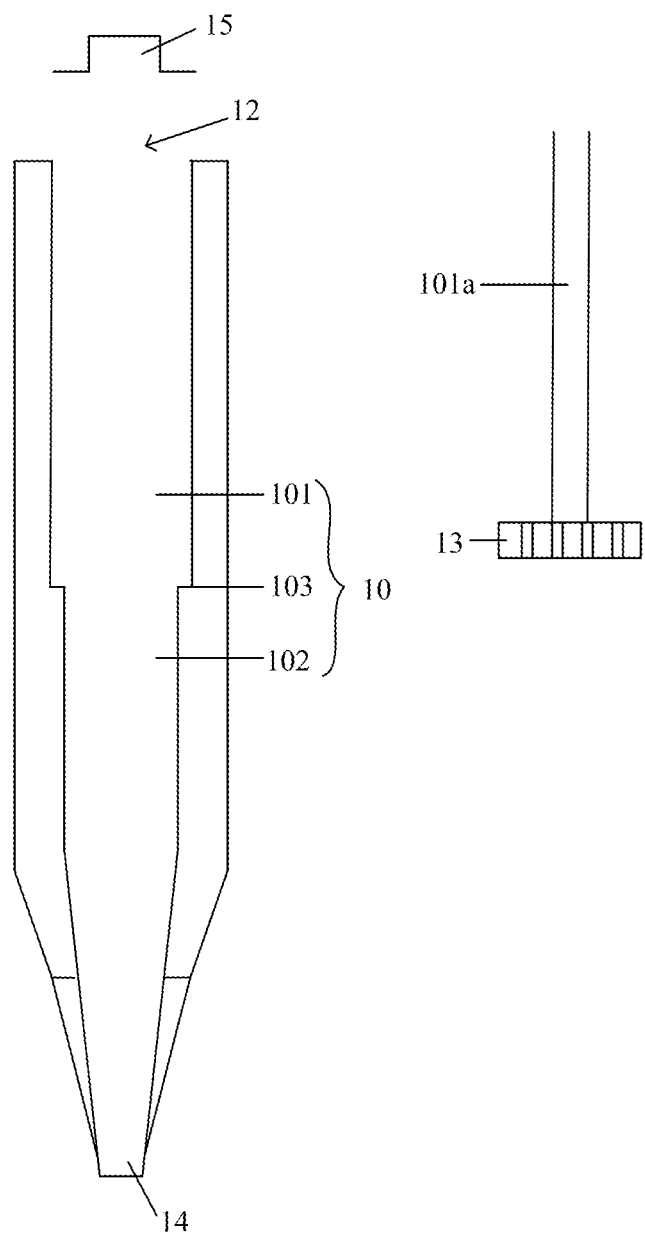
FIG. 2 is a schematic perspective view of the filtrating equipment of the sealant injector according to the present invention.

Refer to FIG. 2, before assembling, the upper cavity 101 and the under cavity 102 of the sealant injector is run through. At assembling, firstly, inserting the inner gas-guide tube 102a and the filtrating equipment 13 into the cavity, then the filtrating equipment 13 is clamped on the step 103 and the cavity is spaced into the upper cavity 101 and the under cavity 102 with the filtrating equipment 13; secondly, filling the sealant into the cavity from the opening 12 on the top of the cavity 10, the most sealant could be filled in the upper cavity 101 and a small amount sealant be pass through the filtrating holes 104; thirdly, coating the packaging cap 15, the high pressure nitrogen could be lead into the under cavity 102 and the upper cavity 101 respectively by the inner gas-guide tube 102a and the outer gas-guide tube 101a. In the present embodiment, pushing higher pressure into the upper cavity 101 and lower pressure into the under cavity 102, even at a negative pressure. And then the sealant could be forced from the upper cavity 101 into the under cavity 102. Because the pressure of the under cavity 102 is lower than that of in the upper cavity 101, the sealant could not be coating on the base board and also with little requirement at stability of the rate of flow. While be on the coating, the higher pressure nitrogen would be forced onto the upper cavity 101 and the under cavity 102 at the same time. The pressure of the upper cavity 101 is equal to or less than that of in the under cavity 102, and there are no hamper like the filtrating equipment 13 in the under cavity 102, so that the stability of the coating is better than prior art. At the same time, the larger impurity particles would be blow to the top with the sealant in the upper cavity 101 at the higher pressure of the under cavity 102, in order to be benefit to the next coating circle. With the inequality pressure, the problem that the part of filtrating hole is plug up by the larger impurity particles to make the coating course instability would be solved. With the adjusting of the pressure lead into the upper cavity 101 and the under cavity 102, on the one hand, the coating course could be more smoothly, on the other hand, the large impurity particles could be blow up from the filtrating hole 104 so as to make the extrusion of the sealant more smoothly. At last, the extrusion sealant could be molded into the display frame in a mould. After the filtering to the large impurity particles by filtrating equipment, the extrusion sealant would be more uniform and then the molding display frame would have prefer intensity and tenacity.

The sealant injector for molding a display frame is provided for extruding the sealant out of the cavity, the large impurity particles could be insulated from the filtrating holes for preventing the mixing particles or the air bubble forcing out from the spray nozzle. The extrusion sealant could be more uniform. The sealant could be coated on the base board with the filtering and forcing. Accordingly, it would increase the continuation, the stability, the strength and the tenacity of the sealant and then improve the rate of good products. The sealant injector of the present invention has a breakthrough on the molding of the display frame comparing with the prior filtering system. On the process of filtering and extruding together, it could reduce the molding time and improve the manufacture efficiency. The inner and smaller filtrating equipment of the present invention is replaced the outer and larger filtrating equipment of the prior art for reducing the input of the cost. More important, the different gas-guide tubes are separately inserted into the upper cavity and the under cavity which are divided by the filtrating equipment. With leading the different pressure into the upper cavity and the under cavity separately, the extruding and coating would be more smoothly. On the other hand, the larger impurity particles could not be embedded into the filtrating holes to make the coating process stability and smoothly. With the adjusting of the pressure value, the larger impurity particles could be blow up from the filtrating holes to ensure it smoothly coating, so that the particles could not be force onto the base board.

What is claimed is:

1. A sealant injector for molding a display frame, comprising a cavity, an opening being opened on the top of the cavity for connecting with high pressure nitrogen, and a spray nozzle located at the bottom of the cavity, a sealant filling in the cavity being extruded from the spray nozzle, a filtrating equipment is located in the cavity for filtering a plurality of larger impurity particles mixing with the sealant, the cavity is separated into an upper cavity and an under cavity by the filtrating equipment, and a step is forming between the upper cavity and the under cavity for holding the filtrating equipment, the filtering equipment having a plurality of the filtrating holes as openings, and two gas-guide tubes are separately inserted into the upper cavity and the under cavity for connecting the high pressure nitrogen.

2. The sealant injector for molding a display frame of claim 1, wherein the pressure of the upper cavity is greater than the pressure in the under cavity before molding, and the pressure of the upper cavity is equal to or less than the pressure in the under cavity while molding.

3. The sealant injector for molding a display frame of claim 2, wherein the gas-guide tubes comprise an inner gas-guide tube and an outer gas-guide tube enwrapping together, the inner gas-guide tube is inserted into the filtrating equipment which the one end of the inner gas-guide tube is connecting with the high pressure nitrogen and the other end is lead into the under cavity, the outer gas-guide tube is around the inner gas-guide tube for leading the high pressure nitrogen into the under cavity.

4. The sealant injector for molding a display frame of claim 3, wherein the pressure difference between the upper cavity and the under cavity is 0~0.7 MPa.

5. The sealant injector for molding a display frame of claim 1, wherein the inner diameter of the upper cavity is larger than that of the under cavity.

6. The sealant injector for molding a display frame of claim 1, wherein the gap between the filtrating holes is equal to each other and the shape thereof could be selected from the circular, the square or the oblong shape.

7. The sealant injector for molding a display frame of claim 4, wherein the diameter of the holes are 10~50 μm, the inner diameter of the outlet of the spray nozzle is 150~500 μm.

8. The sealant injector for molding a display frame of claim 1, wherein the filtrating equipment is assembled at the inner wall of the sealant injector with screws.

9. A method for injection molding a display frame using a sealant injector, comprising the following steps:
1) inserting a filtrating equipment into a cavity to separate the cavity into an upper cavity and an under cavity;
2) connecting one end of an inner gas-guide tube to high pressure nitrogen and inserting the other end into the filtrating equipment;
3) filling sealant in the cavity to package it;
4) leading the high pressure nitrogen separately into the under cavity via the inner gas-guide tube and into the upper cavity via the outer gas-guide tube to force the sealant into the under cavity, and then to be force out from the spray nozzle with a plurality of larger impurity particles filtered by the filtrating equipment; and
5) molding the extrusive sealant in the mould to form the display frame.

10. The method for injection molding a display frame using the sealant injector of claim 9, wherein before molding, the pressure of the upper cavity is greater than the pressure in the under cavity, and while molding, the pressure of the upper cavity is equal to or than the pressure in the under cavity.

11. The method for injection molding a display frame using the sealant injector of claim 10, wherein the pressure difference between the upper cavity and the under cavity is 0~0.7 MPa.

12. The method for injection molding a display frame using the sealant injector of claim 10, wherein the inner diameter of the upper cavity is larger than that of the under cavity.

13. The method for injection molding a display frame using the sealant injector of claim 9, wherein the gap between the filtrating holes is equal to each other.

14. The method for injection molding a display frame using the sealant injector of claim 13, wherein the diameter of the holes are 10~50 μm.

15. The method for injection molding a display frame using the sealant injector of claim 9, wherein, the inner diameter of the outlet of the spray nozzle is 150~500 μm.

* * * * *